(12) United States Patent
Moon et al.

(10) Patent No.: US 9,394,989 B2
(45) Date of Patent: Jul. 19, 2016

(54) SHIFT LEVER OF AUTOMOTIVE TRANSMISSION

(71) Applicant: SL Corporation, Daegu (KR)

(72) Inventors: Sang Ho Moon, Busan (KR); Yun Je Hwang, Ulsan (KR)

(73) Assignee: SL Corporation, Daegu (KR)

( * ) Notice: Subject to any disclaimer, the term of this patent is extended or adjusted under 35 U.S.C. 154(b) by 286 days.

(21) Appl. No.: 13/744,961

(22) Filed: Jan. 18, 2013

(65) Prior Publication Data

US 2013/0298712 A1 Nov. 14, 2013

(30) Foreign Application Priority Data

May 11, 2012 (KR) .................. 10-2012-0050340

(51) Int. Cl.
*F16H 59/02* (2006.01)
*F16H 59/10* (2006.01)

(52) U.S. Cl.
CPC ........ *F16H 59/0278* (2013.01); *F16H 59/0217* (2013.01); *F16H 59/105* (2013.01); *Y10T 74/2014* (2015.01)

(58) Field of Classification Search
CPC F16H 59/0278; F16H 59/0217; F16H 59/105
USPC ............ 74/473.3–473.33; 439/682, 687, 692, 439/699.1
See application file for complete search history.

(56) References Cited

U.S. PATENT DOCUMENTS

| 2,130,424 A | * | 9/1938 | Grant ................. H01R 33/94 439/692 |
| 2,398,634 A | * | 4/1946 | Geers et al. ............... 439/699.1 |
| 5,345,836 A | | 9/1994 | Yokoyama et al. |
| 5,727,423 A | * | 3/1998 | Torii et al. ...................... 74/335 |

FOREIGN PATENT DOCUMENTS

| JP | 2002-248959 A | 9/2002 |
| JP | 2005-014638 A | 1/2005 |
| JP | 2011246089 A | 12/2011 |
| KR | 10-2004-0094903 A | 11/2004 |
| KR | 10-2009-0111111 A | 10/2009 |
| KR | 10-2012-0037244 A | 4/2012 |

* cited by examiner

*Primary Examiner* — William C Joyce
(74) *Attorney, Agent, or Firm* — Mintz Levin Cohn Ferris Glovsky and Popeo, P.C.; Kongsik Kim; Carolina Säve

(57) ABSTRACT

A shift lever of an automotive transmission is provided, which reduces operating time and an assembling process. The shift lever includes a knob, a rod coupled to the knob, and a plurality of connectors formed at one side of each of the knob and the rod and electrically connected when the knob and the rod are coupled to each other, wherein the plurality of connectors comprises: a first connector including a plurality of first connection terminals spaced apart a predetermined distance from each other, and a second connector including a plurality of second connection terminals inserted between each of the plurality of first connection terminals when the knob and the rod are coupled to each other to face the plurality of first connection terminals, the plurality of second connection terminals each having a surface contacting a surface of each of the plurality of first connection terminals.

14 Claims, 8 Drawing Sheets

SHIFT LEVER OF AUTOMOTIVE TRANSMISSION

CROSS-REFERENCE TO RELATED APPLICATION

This application claims priority from Korean Patent Application No. 10-2012-0050340 filed on May 11, 2012 in the Korean Intellectual Property Office, the disclosure of which is incorporated herein by reference in its entirety.

BACKGROUND OF THE INVENTION

1. Field of the Invention

The present invention relates to a shift lever of an automotive transmission, and more particularly, to a shift lever of an automotive transmission, which can reduce an operating time and an assembling process when the shift lever is assembled in the automotive transmission.

2. Description of the Related Art

Automotive transmissions change gear ratios in order to constantly maintain the rotation of an engine according to the speed of a vehicle. In order to change the gear ratio, a shift lever or electronic shifting means which is connected to the automotive transmission are typically operated by the driver (in the case of a manual or automated manual transmission). Transmissions can largely be classified into three types of transmissions: a manual transmission; an automatic transmission; and a manumatic (tiptronic) transmission. In the manual transmission, a driver is able to manually/mechanically change the gear ratio (gear) in the transmission through the use of a lever or stick shifter installed in the vehicle. Conversely, in the automatic transmission, the gears are automatically changed according to the speed of a vehicle via a slipping action. In the manumatic transmission, drivers are able to perform a manual shift operation by increasing or decreasing the gear ratio while performing the automatic shift operation in parallel or may choosing to operate the vehicle in a manual transmission mode, or to perform the automatic shift operation by providing an automotive transmission together with the manual transmission.

The automotive transmission is provided with a shift lock function called a transmission lock function. The shift lock function was developed to prevent accidents associated with sudden unintended acceleration. The shift lock function basically includes a primary shift lock function for preventing a gear position of a shift lever from moving from parking position "P" or neutral position "N" to another gear position unless a brake pedal is depressed, and a secondary shift lock function of preventing the gear position of the shift lever from moving to reverse position "R" when the vehicle is moving in a forward direction at a predetermined speed or higher. In addition, in order to fully prevent a driver's malfunction, a full shift lock function may be provided for all gear positions.

Therefore, in order for a driver to move the shift lever to select a gear position, the shift lock function should be released. In general, a release button for releasing the shift lock function is provided in a knob serving as a handle installed at one end of the shift lever. If the driver moves the knob, the shift lever is moved in one direction to select the gear position. Here, the driver moves the knob while pressing the release button which is installed in the knob.

In order to allow the driver to release the shift lock function while pressing the release button, there is a need for a signal transmission system according to manipulation of the release button. When the knob and the rod are coupled to each other to transmit a signal by manipulating the release button, signal transmission is enabled by connecting the connectors formed in the knob and the rod. In this case, separately from a coupling process of the knob and the rod, a connecting process of the connectors is also required, thereby increasing the operating time and the assembling process.

Accordingly, in order to facilitate connection of the connectors when coupling the knob and the rod to each other, there is demand for methods of reducing the operating time and the assembling process.

SUMMARY OF THE INVENTION

The present invention provides a shift lever of an automotive transmission, which can simplify the overall process of assembling and disassembling the shift lever without using a separate assembling process by making one-side of the surfaces of connection terminals of connectors formed in a knob and a rod contact each other to electrically connect to each other when the shift lever is assembled in the automotive transmission by coupling the knob and the rod to each other. The present invention also provides a shift lever of an automotive transmission, which can minimize a driver's physical contact or induction of foreign materials by mounting connection terminals of connectors formed in a knob and a rod perpendicular to the shift lever in a long axis direction of the shift lever.

The above and other objects of the present invention will be described in or be apparent from the following description of the preferred embodiments.

According to an aspect of the present invention, there is provided a shift lever of an automotive transmission, including a knob; a rod coupled to the knob; and a plurality of connectors formed at one side of each of the knob and the rod and electrically connected when the knob and the rod are coupled to each other. The plurality of connectors includes a first connector having a plurality of first connection terminals spaced apart a predetermined distance from each other; and a second connector having a plurality of second connection terminals inserted between each of the plurality of first connection terminals when the knob and the rod are coupled to each other to face the plurality of first connection terminals. The plurality of second connection terminals each having a surface contacting a surface of each of the plurality of first connection terminals.

As described above, the shift lever of an automotive transmission according to the exemplary embodiment of the present invention provides at least the following advantages.

First, the overall process of assembling and disassembling the shift lever can be simplified without using a separate assembling process by making one-side of the surfaces of connection terminals of connectors formed in a knob and a rod contact each other to be electrically connected to each other.

Next, one-side of the surfaces of connection terminals of connectors formed in a knob and a rod are made to contact each other to electrically connect to each other. Thus, when the knob and the rod are disassembled for repair and maintenance of the shift lever, the connectors can be simply disassembled without using a separate disassembling process of the connectors, thereby increasing operation convenience.

In addition, since the connection terminals of connectors formed in a knob and a rod are mounted perpendicular to the shift lever in a longitudinal axis direction of the shift lever, exposed portions are minimized, thereby minimizing a driver's physical contact or induction of foreign materials.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
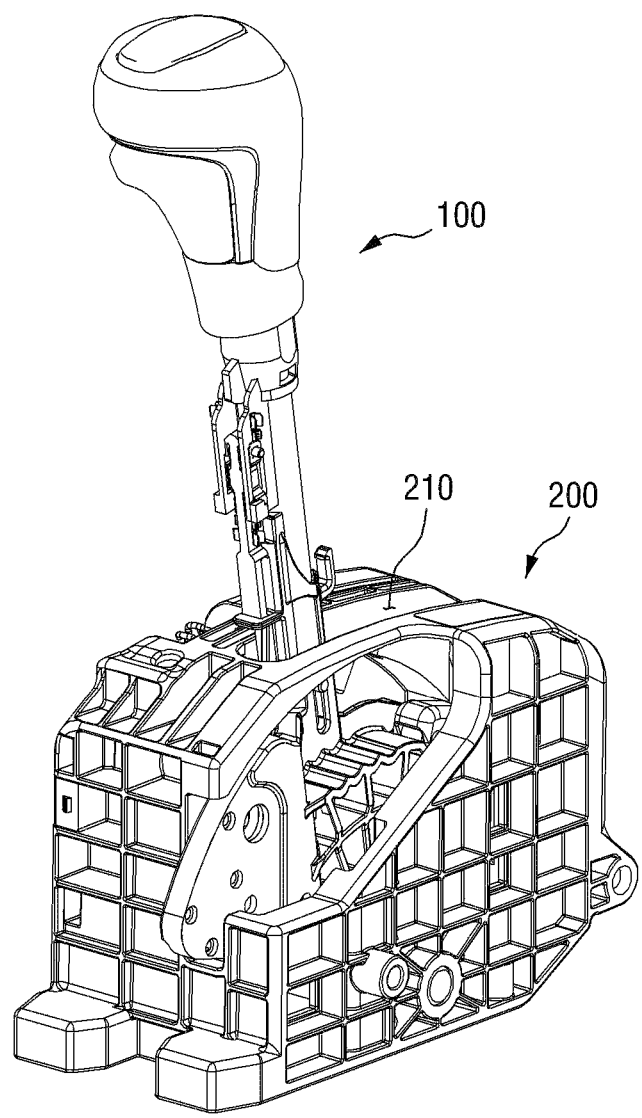
FIG. 1 is a perspective view of an automotive transmission according to an exemplary embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like numbers refer to like elements throughout.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

In some embodiments, well-known methods, procedures, components, and circuitry have not been described in detail to avoid unnecessarily obscuring aspects of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention. In the drawings, the size and relative sizes of layers and regions may be exaggerated for clarity.

Hereinafter, a shift lever of an automotive transmission according to an embodiment of the present invention will be described with reference to the accompanying drawings.

Figure 2:
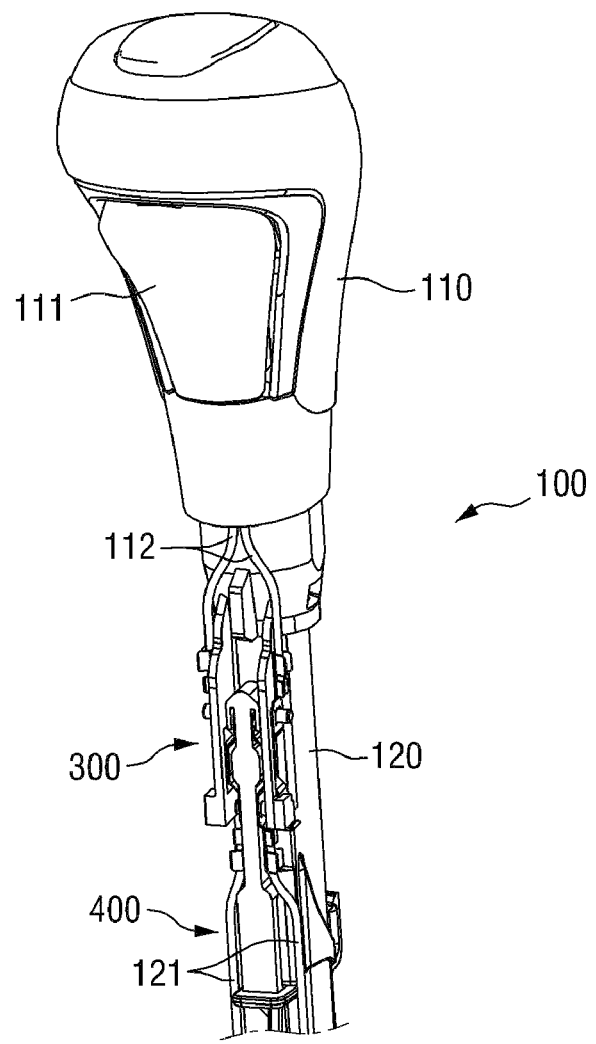
FIG. 2 is a perspective view of a shift lever of the automotive transmission shown in FIG. 1.

FIG. 1 is a perspective view of an automotive transmission according to an embodiment of the present invention and FIG. 2 is a perspective view of a shift lever of the automotive transmission shown in FIG. 1. Referring to FIG. 1, the automotive transmission 1 according to an exemplary embodiment of the present invention may include a shift lever 100 and a base bracket 200.

The shift lever 100 may move in one direction to select a gear position. More specifically, the shift lever 100 may move in a predetermined distance back and forth or from side to side, thereby selecting a desired gear position. Here, it has been described that the shift lever 100 may move in a predetermined distance back and forth or from side to side, which is, however, provided by way of example to facilitate the understanding of the present invention, but aspects of the present invention are not limited thereto. Rather, the movement of the shift lever 100 may vary in many ways along the passage 210 formed in the base bracket 200. That is to say, the shift lever 100 may move in all directions along the passage 210 formed in the base bracket 200.

The base bracket 200 may be configured to surround one side of the shift lever 100 and may protect the shift lever 100 and other components for selecting a gear position according to the movement of the shift lever 100 and performing a shift lock function for preventing the shift lever 100 from moving in particular circumstances. Meanwhile, although not shown in FIG. 1, an indicator (not shown) for displaying selectable gear positions or a currently selected gear position or providing a passage along which the shift lever 100 moves with the base bracket 200 may be installed at one side, for example, an upper side, of the base bracket 200.

The indicator may provide a passage having an "I" shape, an "H" shape or a "I+" shape, for example, along which the shift lever 100 moves with the base bracket 200. As shown in FIG. 1, when the base bracket 200 provides the passage 210 having "I" shape, the indicator may also provide a passage having the same shape as the base bracket 200. The gear position, such as parking position "P," reverse position "R," neutral position "N" or driving position (D), may be indicated and the indicated gear positions may vary in various manners according to the shape of the passage along which the shift lever 100 moves or the transmission mode (e.g., automatic transmission, manual transmission, and manumatic transmission).

In addition, in the illustrative embodiment of the present invention, it has been described that the indicator is positioned at an upper side of the base bracket 200 and is exposed to the outside to display selectable gear positions, but aspects of the present invention are not limited. In a case where the shift lever 100 is formed of a boot type with a portion surrounded by a cover, selectable gear positions or the currently selected gear position may be displayed at one side of the shift lever 100, for example, the knob 110 to be described later or a display device separately installed within the vehicle.

Referring to FIG. 2, the knob 110 serving as a handle may be installed at one side of the shift lever 100 to allow the driver to move the shift lever 100, and one side of the knob 110 may be coupled to the rod 120. The base bracket 200 may surround one side of the rod 120. Therefore, if the driver moves the knob 110, the rod 120 connected to the knob 110 is moved in one direction, thereby selecting user's desired gear position.

In addition, the knob 110 may include a release button 111 for releasing a shift lock function of preventing the shift lever 100 from moving. In a state in which the driver does not press the release button 111, the shift lever 100 can be prevented from moving by the shift lock function. However, in a state in which the driver presses the release button 111, the shift lock function is released, thereby moving the shift lever 100. The release button 111 can be used with all kinds of gear positions or can be used with only several gear positions.

Here, in the illustrative embodiment of the present invention, it has been described that only the release button 111 for releasing the shift lock function is provided in the knob 110, which is, however, provided by way of example to facilitate the understanding of the present invention, but aspects of the present invention are not limited thereto. Rather, various kinds of buttons, including a button for changing the transmission mode, may be provided according to the use and necessity as long as they can support various transmission modes.

The release button 111 prevents the driver from selecting an unintended gear position, thereby minimizing the probability of occurrence of vehicle accidents or sudden unintended acceleration accidents due to erroneous manipulation of the shift lever 100.

The shift lever 100 requires an electrical connection mechanism for transmitting a manipulation signal of the release button 111, for example, releasing the shift lock function by transmitting a signal based on manipulation of the release button 111 between the knob 110 and the rod 120. The shift lever 100 according to the exemplary embodiment of the present invention may include a plurality of connectors 300 and 400 formed on one side of the knob 110 and the rod 120 to be electrically connected to each other, thereby enabling signal transmission without a separate assembling process when the knob 110 and the rod 120 are coupled to each other.

In the illustrative embodiment of the present invention, the plurality of connectors 300 and 400 are referred to as the first connector 300 and the second connector 400, respectively, the first connector 300 is formed at one side of the knob 110 and the second connector 400 is formed at one side of the rod 120, which will now be described by way of example.

In the illustrative embodiment of the present invention, it has been described that the first connector 300 is formed at one side of the knob 110 and the second connector 400 is formed at one side of the rod 120, which is, however, provided by way of example to facilitate the understanding of the present invention, but aspects of the present invention are not limited thereto. Rather, the first connector 300 and the second connector 400 may be separately provided and connected to the knob 110 and the rod 120, respectively. In addition, lines 112 and 121 for transmitting manipulation signals of the release button 111 may be connected to the knob 110 and the rod 120, respectively, In the illustrative embodiment of the present invention, it has been described that the first connector 300 and the second connector 400 are formed for the purpose of transmitting the manipulation signal of the release button 111, but aspects of the present invention are not limited thereto. As described above, the first connector 300 and the second connector 400 may also formed to transmit a pertinent signal according to the button formed in the knob 110

Hereinafter, the first connector 300 and the second connector 400 will be described.

Figure 3:
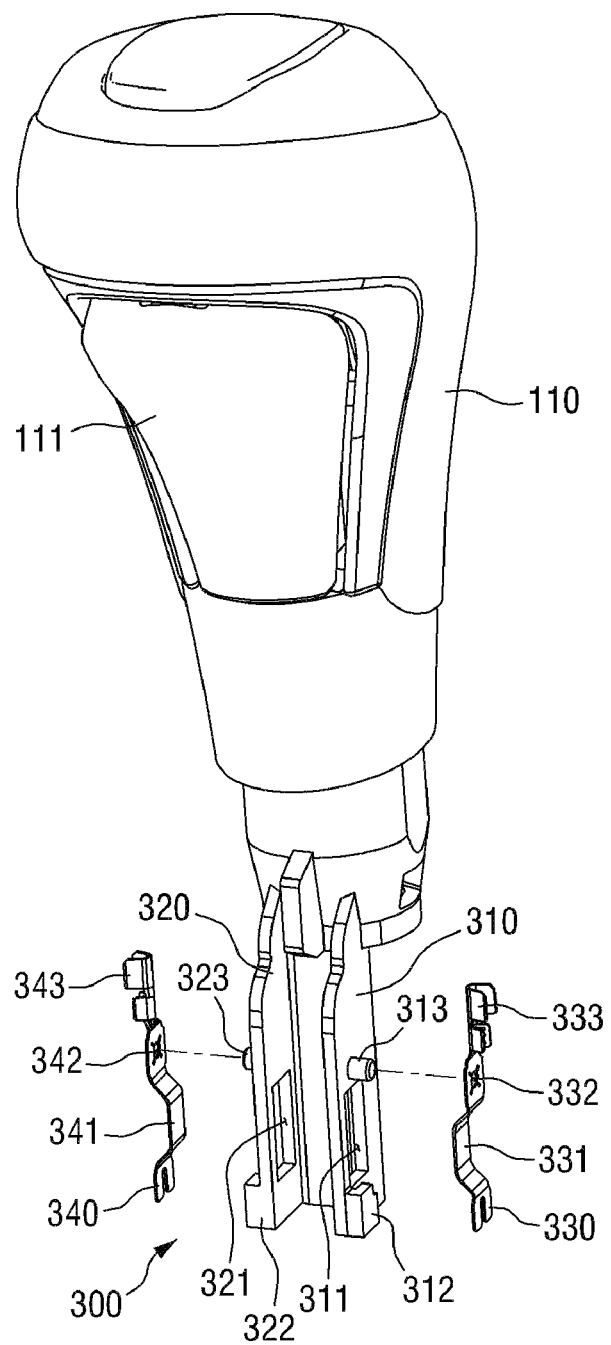
FIG. 3 is an exploded perspective view of a first connector according to an exemplary embodiment of the present invention.

FIG. 3 is an exploded perspective view of a first connector according to an embodiment of the present invention. As shown in FIG. 3, the first connector 300 according to an exemplary embodiment of the present invention may include a plurality of mounting members 310 and 320 formed on one side of a knob 110 to be spaced a predetermined distance apart from each other and having one-side surfaces facing each other, and a plurality of first connection terminals 330 and 340 mounted on the plurality of mounting members 310 and 320.

Hereinafter, in the exemplary embodiment of the present invention, the one-side surfaces of the plurality of mounting members 310 and 320 facing each other are referred to as "facing surfaces" and the other-side surfaces are referred to as "non-facing surfaces."

The plurality of first connection terminals 330 and 340 may have plate shapes and may be mounted on non-facing surfaces of the plurality of mounting members 310 and 320, respectively. Some of the plurality of first connection terminals 330 and 340 may have first protrusion parts 331 and 341 protruding to face each other. The plurality of mounting members 310 and 320 include exposure apertures 311 and 321 formed to allow the first protrusion parts 331 and 341 to be exposed to the facing surfaces of the plurality of mounting members 411 and 412. Accordingly, even when the plurality of first connection terminals 330 and 340 are mounted on the non-facing surfaces of the plurality of mounting members 310 and 320, in view of the plurality of mounting members 310 and 320, the first protrusion parts 331 and 341 may be exposed between the plurality of mounting members 310 and 320.

In the illustrative embodiment of the present invention, it has been described that the plurality of first connection terminals 330 and 340 are mounted on the non-facing surfaces of the plurality of mounting members 310 and 320, respectively, and only the first protrusion parts 331 and 341 are exposed to the facing surfaces from the plurality of mounting members 310 and 320, which is, however, provided by way of example to facilitate the understanding of the present invention, but aspects of the present invention are not limited thereto. Rather, the plurality of first connection terminals 330 and 340 may be installed on facing surfaces of the plurality of mounting members 310 and 320, respectively.

Meanwhile, when the plurality of first connection terminals 330 and 340 are mounted on the plurality of mounting members 310 and 320, one side of the plurality of first connection terminals 330 and 340 are inserted into the first insertion grooves 312 and 322 formed on the non-facing surfaces of the respective the plurality of mounting members 310 and 320, and the first fixing protrusions 313 and 323 formed on the non-facing surfaces of the respective the plurality of mounting members 310 and 320 may be inserted into the first fixing apertures 332 and 342 formed on the plurality of first connection terminals 330 and 340.

Here, the first fixing protrusions 313 and 323 are formed in step like shape at bottom ends, that is, one of the ends close to the non-facing surfaces, thereby preventing the first fixing protrusions 313 and 323 inserted into the first fixing apertures 332 and 342 from being dislodged. In this case, the first fixing protrusions 313 and 323 may be formed to have larger diameters than the first fixing apertures 332 and 342, except for the bottom ends.

Figure 4:
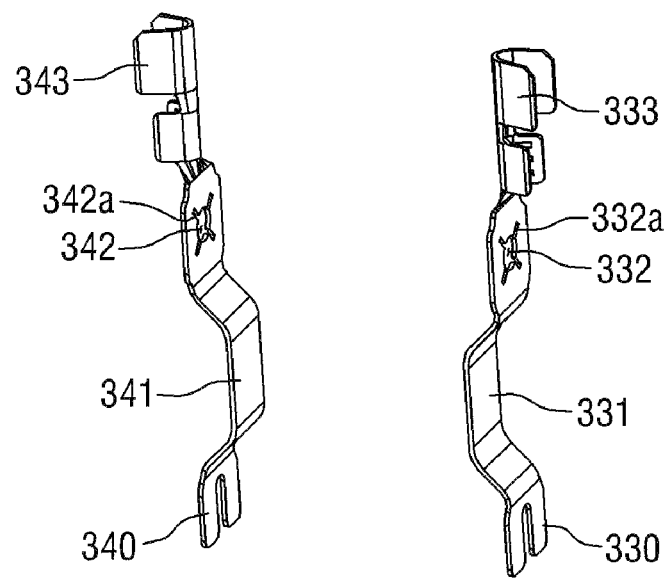
FIG. 4 is a perspective view of a first connection terminal according to an exemplary embodiment of the present invention.

The first fixing apertures 332 and 342 may be formed to have an elastic force to allow the first fixing protrusions 313 and 323 to be inserted into the first fixing apertures 332 and 342 by forming grooves 332a and 342 around the first fixing apertures 332 and 342, as shown in FIG. 4, which is, however, provided by way of example to facilitate the understanding of the present invention, but aspects of the present invention are not limited thereto. Rather, the first fixing apertures 332 and 342 may be formed to have an elastic force by employing an elastic material to the peripheries thereof. In addition, line connection parts 333 and 343 to which the line 112 for transmitting manipulation signals of the release button 111 formed in the knob 110 is connected, may be formed at one ends of the first connection terminals 330 and 340.

Figure 5:
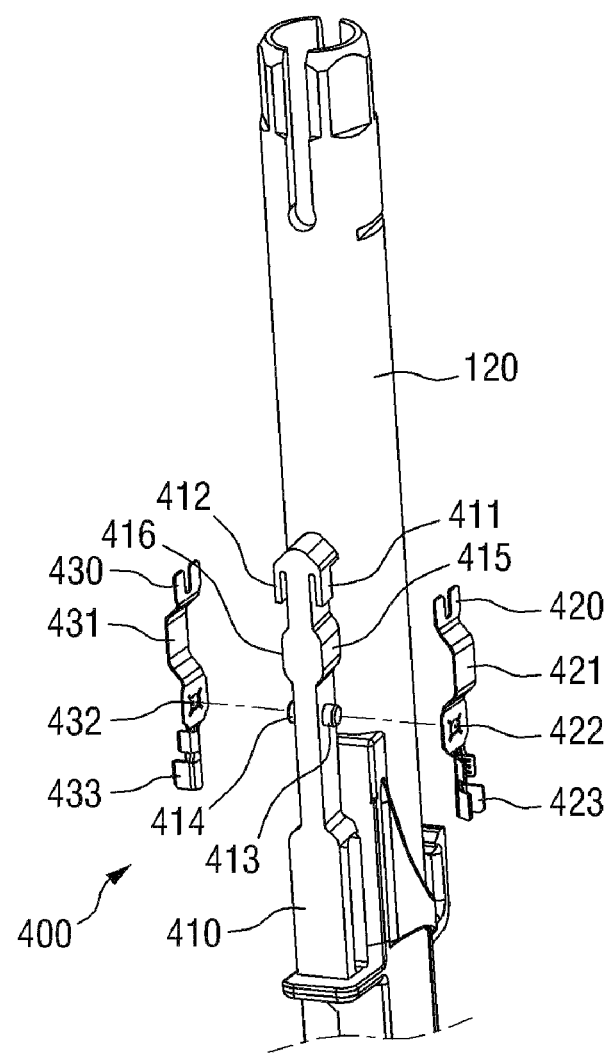
FIG. 5 is an exploded perspective view of a second connector according to an exemplary embodiment of the present invention.

FIG. 5 is an exploded perspective view of a second connector according to an embodiment of the present invention. As shown in FIG. 5, the second connector 400 according to an exemplary embodiment of the present invention may include an insertion member 410 inserted between the plurality of mounting members 310 and 320 of the first connector 300 when the knob 110 and the rod 120 are coupled to each other and having one-side of the surfaces of the plurality of second connection terminals 420 and 430 contacting one-side of the surfaces of the plurality of first connection terminals 330 and 340.

Like the plurality of first connection terminals 330 and 340, the plurality of second connection terminals 420 and 430 may have plate shapes and may be mounted at both sides of the insertion member 410 to face the plurality of first connection terminals 330 and 340 when the knob 110 and the rod 120 are coupled to each other. In addition, the second protrusion parts 421 and 431 protruding in opposite directions to the first protrusion parts 331 and 341 of the terminals 420 and 430 are formed at the plurality of second connection terminals 420 and 430, creating spacing when the plurality of first connection terminals 330 and 340 contacts the plurality of second connection terminals 420 and 430, thereby minimizing the probability of contact failures.

Furthermore, the insertion member 410 may include support protrusions 415 and 416 for supporting the second protrusion parts 421 and 431, and shapes of the support protrusions 415 and 416 may vary according to the shapes of the second protrusion parts 421 and 431. The plurality of second insertion groove 411 and 412 into which one sides of the plurality of second connection terminals 420 and 430 are fixedly inserted are formed at one side of the insertion member 410, and the plurality of second fixing protrusion 413 and 414 inserted into the second fixing apertures 422 and 432 formed in the plurality of second connection terminals 420 and 430 are formed at both sides of the insertion member 410, Like the first connector 300, the second connector 400 includes the plurality of second fixing protrusions 413 and 414 formed in a step like shape at bottom ends thereof, thereby preventing the second fixing protrusions 413 and 414 inserted into the plurality of second fixing apertures 422 and 432 from being dislodged. In this case, the plurality of second fixing protrusions 413 and 414 may be formed to have larger diameters than the plurality of second fixing apertures 422 and 432, except for the bottom ends.

Additionally, like the plurality of first fixing apertures 332 and 342 shown in FIG. 4, the plurality of second fixing apertures 422 and 432 may also be formed to have an elastic force, and the line connection parts 423 and 433 to which the line 121 is connected, may be formed at one of the ends of the second connection terminals 420 and 430.

As shown in FIGS. 3 and 5, in the exemplary embodiment of the present invention, the plurality of first connection terminals 330 and 340 and the plurality of second connection terminals 420 and 430 may have plate shapes and may have one-side of the surfaces thereof contact each other. Therefore, unlike when two terminals have a male-type terminal and a female-type terminal, when the knob 110 and the rod 120 are coupled to each other, they can be electrically connected to each other without a separate assembling process, thereby reducing an operating time or assembling process for assembling the shift lever 100. In addition, when the knob and the rod are disassembled for repair and maintenance of the shift lever 100, the terminals can be easily separated shift lever 100 without applying an excessive force.

In the illustrative embodiment of the present invention, it has been described that the plurality of first connection terminals 330 and 340 and the plurality of second connection terminals 420 and 430 have plate shapes, which is, however, provided by way of example to facilitate the understanding of the present invention, but aspects of the present invention are not limited thereto. Rather, the plurality of first connection terminals 330 and 340 and the plurality of second connection terminals 420 and 430 may have various shapes as long as they have one-side surfaces contacting each other.

In the illustrative embodiment of the present invention, the plurality of first connection terminals 330 and 340 and the plurality of second connection terminals 420 and 430 are mounted parallel to the shift lever 100 in a longitudinal axis direction of the shift lever 100. In other words, in the illustrative embodiment of the present invention, since the rod 120 is shaped as a cylinder and the plurality of first connection terminals 330 and 340 and the plurality of second connection terminals 420 and 430 are mounted to be perpendicular to a tangent line at an external location of the rod 120 and parallel with the rod 120, the number of portions exposed are reduced, thereby minimizing a driver's physical contact or induction of foreign materials and minimizing the probability of damages cause to the driver or contact failures.

In the illustrative embodiment of the present invention, it has been described that the rod 120 is shaped as a cylinder, which is, however, provided by way of example to facilitate the understanding of the present invention, but aspects of the present invention are not limited thereto. That is to say, even when the rod 120 has a shape other than the cylinder shape, since the plurality of first connection terminals 330 and 340 and the plurality of second connection terminals 420 and 430 are mounted to be perpendicular to the rod 120 in a long axis direction of the rod 120, exposed portions thereof can be reduced when externally viewed.

In addition, it will be understood that when the plurality of first connection terminals 330 and 340 and the plurality of second connection terminals 420 and 430 are mounted perpendicular to the longitudinal axis direction of the shift lever 100 or the rod 120, terminals are not mounted perpendicular to all directions of the shift lever 100 or the rod 120 but are mounted perpendicular to a direction in which the portions exposed to vehicle passengers can be minimized.

In the illustrative embodiment of the present invention, it has been described that the plurality of first connection terminals 330 and 340 and the plurality of second connection terminals 420 and 430 are vertically mounted, which is, however, provided by way of example to facilitate the understanding of the present invention, but aspects of the present invention are not limited thereto. According to the necessity, the plurality of first connection terminals 330 and 340 and the plurality of second connection terminals 420 and 430 may be mounted in various angles, and the shapes of the plurality of mounting members 310 and 320 and the insertion member 410 may vary accordingly.

In the illustrative embodiment of the present invention, it has been described that each two of the plurality of first connection terminals 330 and 340 and the plurality of second connection terminals 420 and 430 are provided, which is, however, provided by way of example to facilitate the understanding of the present invention, but aspects of the present invention are not limited thereto. Rather, the numbers of the plurality of first connection terminals 330 and 340 and the plurality of second connection terminals 420 and 430 may be increased or reduced.

Figure 6:
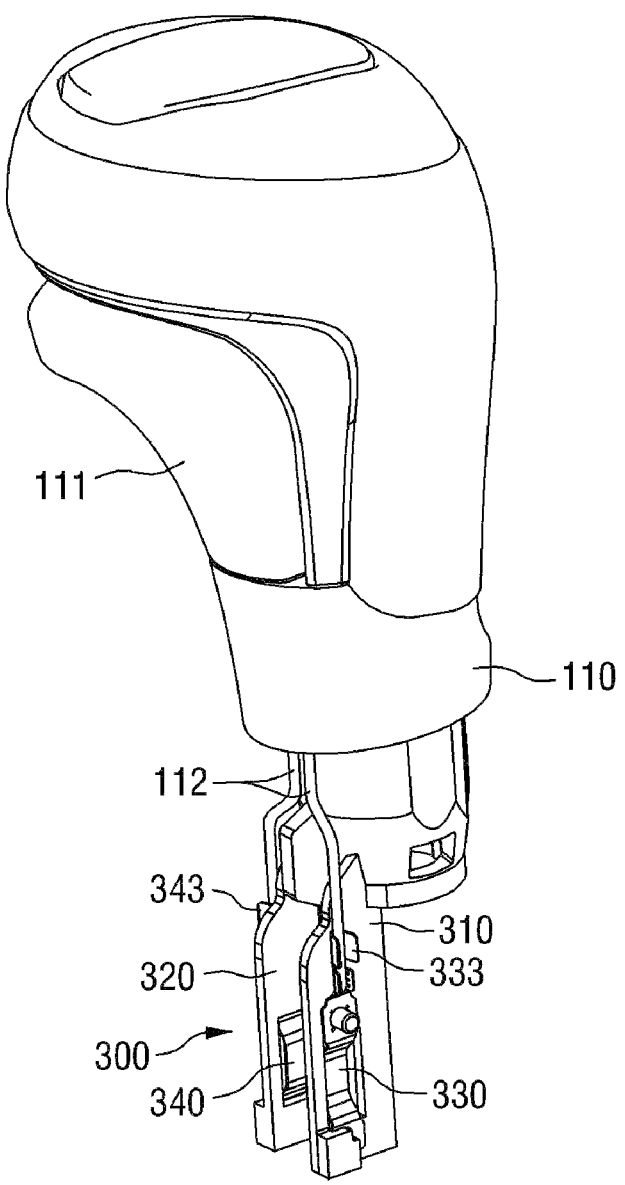
FIG. 6 is a perspective view of a knob according to an exemplary embodiment of the present invention.
Figure 7:
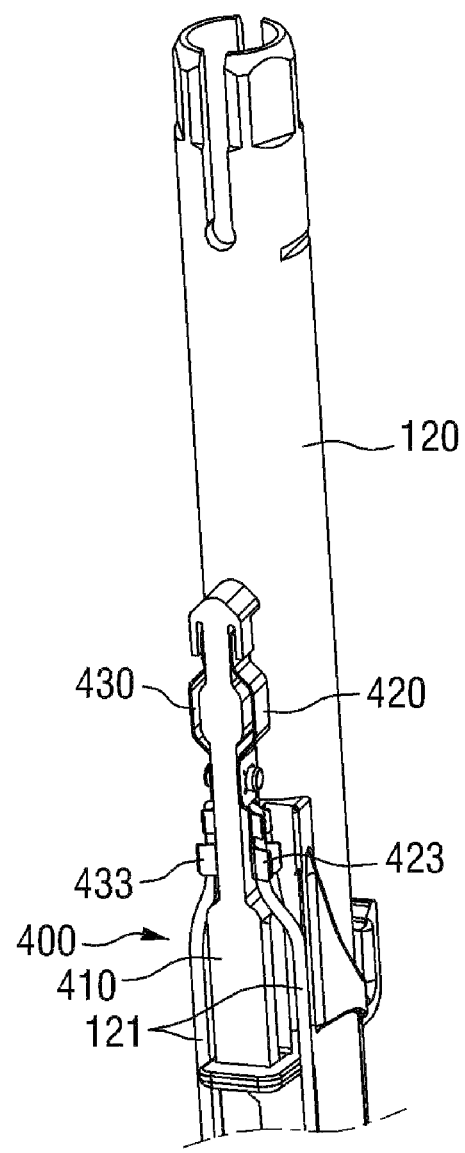
FIG. 7 is a perspective view of a rod according to an exemplary embodiment of the present invention.
Figure 8:
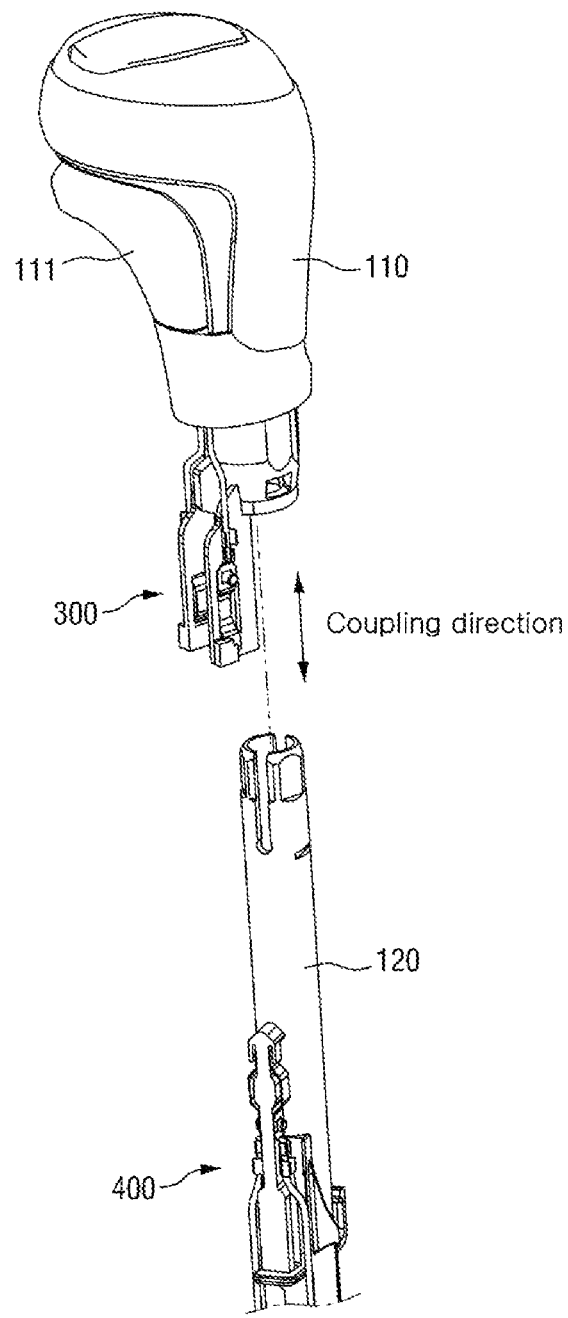
FIG. 8 is a perspective view of a knob and a rod according to an exemplary embodiment of the present invention.

FIGS. 6 to 8 illustrate an assembling process of a shift lever according to an exemplary embodiment of the present invention. The processes shown in FIGS. 6 to 8 may be as an assembling process of the first connector 300 and the second connector 400 when the knob 110 and the rod 120 are coupled to each other. For brevity, reference numerals of some functional components may not be shown in FIGS. 6 to 8, and undefined reference numerals may be used to indicate the same components as those shown in FIGS. 3 and 5.

As shown, the assembling process of a shift lever according to an exemplary embodiment of the present invention includes forming the first connector 300 including the plurality of first connection terminals 330 and 340 mounted on the plurality of mounting members 310 and 320 formed at one side of the knob 110, as shown in FIG. 6. In addition, the first connection terminals 330 and 340 and the line 112 for transmitting manipulation signals of the release button 111 are connected by the line connection parts 333 and 343.

In addition, as shown in FIG. 7, the second connector 400 is formed by mounting the plurality of second connection terminals 420 and 430 at both sides of the insertion member 410 formed at one side of the rod 120, and the plurality of second connection terminals 420 and 430 and the line 121 for transmitting the manipulation signals to be transmitted through the first connector 300 are connected by the line connection parts 423 and 433.

In the illustrative embodiment of the present invention, it has been described that the first connector 300 shown in FIG. 3 is formed in the knob 110 and the second connector 400 shown in FIG. 5 is formed in the rod 120, which is, however, provided by way of example to facilitate the understanding of the present invention, but aspects of the present invention are not limited thereto. On the other hand, the second connector 400 shown in FIG. 5 may be formed in the knob 110 and the first connector 300 shown in FIG. 3 may be formed in the rod 120. Likewise, the plurality of first connection terminals 330 and 340 and the plurality of mounting members 310 and 320, shown in FIGS. 6 and 7, may be mounted in a reverse order.

As shown in FIGS. 6 and 7, once assembling of the first connector 300 and the second connector 400 is completed, when the knob 110 and the rod 120 are coupled to each other, as indicated by an arrow shown in FIG. 8, the first connector 300 and the second connector 400 may be electrically connected while the knob 110 and the rod 120 are coupled to each other, as shown in FIG. 2.

In the illustrative embodiment of the present invention, it has been described that some portions of the second connection terminals 420 and 430 are made to protrude to make contact with the first connection terminals 330 and 340 to prevent the probability of contact failures due to spacing created between the first connection terminals 330 and 340 and the second connection terminals 420 and 430, which is, however, provided by way of example to facilitate the understanding of the present invention, but aspects of the present invention are not limited thereto. Alternatively, one-side of the surfaces of the first connection terminals 330 and 340 and the second connection terminals 420 and 430 may be made to contact each other by adjusting the distance between the first connection terminals 330 and 340 and the plurality of mounting members 310 and 320 or adjusting thicknesses of the first connection terminals 330 and 340 and the second connection terminals 420 and 430. Alternatively, one-side of the surfaces of the first connection terminals 330 and 340 and the second connection terminals 420 and 430 may also be made to contact each other by increasing the protruding parts.

As described above, in the exemplary embodiment of the present invention, when the knob 110 and the rod 120 are coupled to each other, the first connector 300 and the second connector 400 can be connected to each other without a separate assembling process for signal transmission, thereby reducing the operating time and the assembling process. In the present invention, since one-side of the surfaces (that is, facing surfaces) of the first connector 300 and the second connector 300 are made to contact each other, the first connector 300 and the second connector 300 can be easily disassembled from each other when the shift lever 100 is disassembled for maintenance and repair, thereby improving the operating efficiency in maintenance and repair. Meanwhile, the disassembling process for maintenance and repair of the shift lever 100 can be easily performed in the reverse order of the assembling process shown in FIGS. 6 to 8.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A shift lever of an automotive transmission, comprising:
    a knob;
    a rod coupled to the knob; and
    a plurality of connectors formed at one side of each of the knob and the rod and electrically connected when the knob and the rod are coupled to each other,
    wherein the plurality of connectors include:
        a first connector having a plurality of first connection terminals spaced apart a predetermined distance from each other; and
        a second connector including a plurality of second connection terminals inserted between each of the plurality of first connection terminals when the knob and the rod are coupled to each other to face the plurality of first connection terminals, the plurality of second connection terminals each having a surface contacting a surface of each of the plurality of first connection terminals,
    wherein the first connection terminal or the second connection terminal has at least one protrusion part,
    wherein the first connector includes a plurality of mounting members spaced apart a predetermined distance from each other, and the plurality of first connection terminals are mounted on the plurality of mounting members, respectively, wherein the plurality of first connection terminals are mounted on non-facing surfaces of the plurality of mounting members, respectively, and wherein each of the plurality of first connection terminals has a first protrusion part protruding toward facing surfaces of the plurality of mounting members, and each of the plurality of mounting members includes an exposure aperture formed to allow the first protrusion part to be exposed to the facing surface.

2. The shift lever of claim 1, wherein each of the plurality of mounting members comprises:

a first insertion groove formed on the non-facing surface and having one side of the first connection terminal inserted thereto; and a first fixing protrusion formed on the non-facing surface and inserted into a first fixing aperture formed in each of the plurality of first connection terminals.

3. The shift lever of claim 2, wherein the first fixing aperture has a smaller diameter than the first fixing protrusion and the periphery of the first fixing aperture has an elastic force.

4. The shift lever of claim 2, wherein the first fixing protrusion has a step portion at its one end.

5. The shift lever of claim 2, wherein the second connector includes an insertion member inserted between each of the plurality of mounting members when the knob and the rod are coupled to each other, and the plurality of second connection terminals is mounted at both sides of the insertion member and contacting one-side surfaces of the plurality of first connection terminals, respectively.

6. The shift lever of claim 5, wherein the insertion member includes at both sides of the insertion member a second insertion groove having one side of each of the plurality of second connection terminals inserted thereto, and a second fixing protrusion inserted into the second fixing aperture formed in each of the plurality of second connection terminals.

7. The shift lever of claim 6, wherein the second fixing aperture has a smaller diameter than the second fixing protrusion and the periphery of the second fixing aperture has an elastic force.

8. The shift lever of claim 6, wherein the second fixing protrusion has a step portion at one end thereof.

9. The shift lever of claim 6, wherein the plurality of first connection terminals and the plurality of second connection terminals have plate shapes.

10. The shift lever of claim 5, wherein each of the plurality of second connection terminals includes a second protrusion part protruding to face the plurality of mounting members, and the insertion member has a support protrusion supporting the second protrusion part.

11. The shift lever of claim 1, wherein the plurality of first connection terminals and the plurality of second connection terminals are mounted parallel to the shift lever in a long axis direction of the shift lever.

12. A shift lever of an automotive transmission, comprising:

a knob;

a rod coupled to the knob; and a plurality of connectors formed at one side of each of the knob and the rod and electrically connected when the knob and the rod are coupled to each other, wherein the plurality of connectors include:

a first connector having a plurality of first connection terminals spaced apart a predetermined distance from each other; and a second connector including a plurality of second connection terminals inserted between each of the plurality of first connection terminals when the knob and the rod are coupled to each other to face the plurality of first connection terminals, the plurality of second connection terminals each having a surface contacting a surface of each of the plurality of first connection terminals, wherein the first connection terminal or the second connection terminal has at least one protrusion part for contacting the first connection terminal with the second connection terminal, wherein the plurality of first connection terminals are mounted on non-facing surfaces of a plurality of mounting members of the first connector, respectively, and wherein each of the plurality of first connection terminals has a first protrusion part protruding toward facing surfaces of the plurality of mounting members, and each of the plurality of mounting members includes an exposure aperture formed to allow the first protrusion part to be exposed to the facing surface.

13. The shift lever of claim 12, wherein the plurality of mounting members are spaced apart a predetermined distance from each other.

14. The shift lever of claim 12, wherein each of the plurality of mounting members comprises:

a first insertion groove formed on the non-facing surface and having one side of the first connection terminal inserted thereto; and a first fixing protrusion formed on the non-facing surface and inserted into a first fixing aperture formed in each of the plurality of first connection terminals.

* * * * *